United States Patent Office 3,546,314
Patented Dec. 8, 1970

3,546,314
CONVERSION OF OLEFINS
Lewis G. Larson, Bartlesville, Okla., assignor to Phillips Petroleum Company, a corporation of Delaware
No Drawing. Filed Apr. 3, 1967, Ser. No. 627,633
Int. Cl. C07c *3/62*
U.S. Cl. 260—683      9 Claims

ABSTRACT OF THE DISCLOSURE

In the conversion of an olefin into other olefins having different numbers of carbon atoms by contact with a catalyst active for disproportionating propylene into ethylene and butene wherein the catalyst has an initial activity which is quite high, the activity is controlled by pretreating the catalyst with air, containing a minor amount of water, at elevated temperature.

---

This invention relates to the olefin reaction of olefin hydrocarbons to produce other hydrocarbons. In one aspect, it relates to an improved process for the olefin wherein the amount of product is maintained at a more nearly constant level. In another aspect, it relates to a process for the olefin reaction where the initial conversion is reduced.

The olefin reaction is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the abovenoted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention includes at least the following reactions:

(1) The disproportionation of an acyclic mono- or polyene having at least three carbon atoms into other mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms with a different acyclic mono- or polyene having three or more carbon atoms to produce different acyclic olefins; for example, the reaction of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the reaction of ethylene plus 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the reaction of cyclohexene and 2-butene yields 2,8-decadiene; the reaction of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the reaction of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more cyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

In the olefin reaction to convert olefin hydrocarbons into other olefin hydrocarbons in the presence of an olefin reaction catalyst such as a tungsten oxide-silica catalyst, the initial activity of the catalyst, following the induction period, is often quite high. For example, in the disproportionation of propylene to produce ethylene and butenes, the conversion level is preferably maintained below about 46 percent because at conversion levels appreciably above 45 percent, the tendency toward secondary reactions such as polymerization increases rapidly causing high polymer yield and high carbon deposit on the catalyst. This is especially true when using pure olefin feeds such as propylene and since the polymerization reaction is exothermic, conditions leading to a runaway reaction are sometimes created by the high temperature required during the induction period. Furthermore, it is desirable to operate the reaction at a constant or substantially constant conversion level so as to provide a substantially constant feed stream, both in quantity and in composition, to the distillation facilities downstream from the reactors.

It is, therefore, an object of this invention to provide a process for the olefin reaction wherein the activity of the catalyst is controlled. It is also an object of this invention to provide a process for the olefin reaction wherein the initial high activity of the catalyst is reduced without an overall reduction in activity of the catalyst. It is a further object of this invention to provide a process for the olefin reaction wherein the amount of products resulting from the reaction is maintained substantially constant. Yet another object of this invention is to provide a method for controlling the activity of a tungsten oxide silica catalyst in an olefin reaction process. Other aspects, objects and advantages of this invention will be apparent to those skilled in the art upon studying this disclosure including the detailed description of the invention.

According to the process of the present invention, the initial high activity of a catalyst such as a tungsten oxide-silica catalyst, following the induction period, in the olefin reaction process can be controlled by pretreating the fresh catalyst with air containing a minor amount of water at an elevated temperature such as about 1000 to 1200° F.

for a period of about 30 minutes to 24 hours prior to use in the olefin reaction. I have found that the effect of pretreatment of the catalyst with air containing a minor amount of water at high tempreature after regeneration permanently reduces the activity of the catalyst so that it is not necessary to re-treat the catalyst after regeneration. I have also found that pretreatment of the catalyst according to the process of this invention extends the life of the catalyst on the reaction cycle because the activity of the catalyst drops off at a slower rate. The conversion is at a more substantially constant level throughout the reaction cycle when using the catalyst pretreated according to the present invention as compared to untreated fresh catalyst or freshly regenerated catalyst.

The silica component of the tungsten oxide-silica catalyst utilized in the present invention can be any conventional catalyst grade silica. Some examples are precipitated silica gel, microspheroidal silica, flame hydrolyzed silica and silica aerogels. These materials have appreciable surface area, usually in the range of 50 to 700 m.$^2$/g., and can range from fine powders to coarse granules. These materials often contain small amounts of compounds and sodium, in the order of a few tenths percent by weight and smaller. Trace amounts of these and other metals are often present and such small amounts of these materials are not objectionable. The alumina content should be below about 1 per cent by weight, preferably below about ½ percent, although higher concentrations of alumina can sometimes be tolerated. The silica can contain other materials including magnesium oxide in amounts which do not change the essential characteristics of the olefin reconstruction reaction.

The catalyst utilized in the present invention can be prepared by any conventional method. A common method for preparing the tungsten oxide-silica catalyst comprises impregnating the silica with a tungsten compound convertible to the oxide, for example, ammonium tungstate, by wetting the silica with an aqueous solution of ammonium tungstate, evaporating the water and activating the composite catalyst by heating same in a stream of dry air at a temperature of about 1000° F. for a period of one-half hour or longer. The ammonium tungstate is considered to be converted to the oxide during this activation treatment.

Olefins applicable for use in the process of the invention are acrylic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefines; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7-diethyl-1,3,5-decatriene, 1,3,5,7,9-octadecapentaene, 1,3-eicosodadiene, 4-octene, 3-eicosene and 3-heptane, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-proplycyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4 and the like and mixtures thereof.

The operating temperature for the olefin reaction process of this invention is in the range of about 400 to 1100° F. When using the tungsten oxide-silica catalyst for the disproportionation of propylene, the preferred operating temperature will be in the range of about 600 to 900° F. Selecting an operating temperature in the higher portions of the selected temperature range makes the catalyst bed less susceptible to poisoning and promotes more rapid recovery from a temporary reduction in activity. In many instances, an operating temperature at or near regeneration temperature can be selected, thus reducing or eliminating costly or time-consuming cooling and heating cycles. For higher molecular weight olefins, the preferred temperatures will be somewhat lower. Practice of the invention reduces coke formation, particularly at the higher operating temperatures.

Generally, the olefin reaction is essentially independent of pressure, except as pressure affects the density of the feed and thus the contact time. Furthermore, an increase in operating pressure usually results in lower operating temperature at constant conversion level. Pressures in the range of 0 to 1500 p.s.i.g. and higher are suitable. However, particularly with higher olefins, especially olefins having at least 5 carbon atoms per molecule, operating at pressure in the lower portion of the range, e.g., below about 100 p.s.i.g., reduces the tendency to form products more highly branched than the starting material.

The operable range of contact time for the olefin reaction process depends primarily upon the operating temperatures and the activity of the catalyst. In general, undesired reactions are favored by longer contact times; therefore, the contact time should be maintained as short as possible, consistent with desired olefin conversion.

In general, contact times in the range of 0.1 to 60 seconds can be used and contact times in the range of 1 to 60 seconds are suitable in many instances. With a fixed bed reactor and continuous flow operation, weight hourly spaced velocities in the range of 0.5 to 1000 parts by weight of hydrocarbon feed per part by weight of catalyst per hour are suitable, with excellent results having been obtained in the range of 1 to 200.

The olefin reaction can be carried out either in the presence or absence of a diluent. Paraffinic and cycloparaffinic hydrocarbons will often be employed. Suitable diluents include propane, cyclohexane, methylcyclohexane, n-pentane, n-hexane, isooctane, dodecane, and the like, or mixtures thereof, including primarily those paraffins and cycloparaffins having up to about 12 carbon atoms per molecule. Other diluents can be used provided the diluent is nonreactive under the conditions of the olefin reaction.

The catalyst modifying or tempering step according to the process of this invention is applied to the catalyst after the initial activation treatment of the fresh catalyst by passing air containing about 10 to 10,000 parts per million, preferably about 50 to 200 parts per million, of water through the catalyst at a temperature in the range of about 950 to 1150° F., preferably at 1050 to 1100° F. at about regeneration pressure which can be from about 10 to 50 p.s.i.g. and a space velocity of about 40 to 50 cubic feet of air plus water per pound of catalyst per hour for about 30 minutes to 24 hours, preferably about 1 to 5 hours. Treating conditions will usually be about the same as regeneration conditions with respect to temperature, pressure and space velocity so that the treatment can be initiated by introducing water into the air used in the regeratiton step. Following the treatment step, it may be desirable to pass nitrogen through the catalyst bed so as to cool the catalyst down to the desired reaction temperature.

The following specific embodiments of the invention will be helpful in attaining an understanding of the invention but should not be construed as unduly limiting the invention.

EXAMPLE

A catalyst comprising about 91 weight percent silica and about 9 weight percent tungsten oxide was prepared by impregnating catalyst grade silica with an aqueous solution of ammonium meta tungstate and evaporating the water therefrom. The catalyst was activated at about 1100° F. with a stream of air for about 4 hours.

Samples of the catalyst were treated with air containing about 100 p.p.m. by volume of water and with a mixture of about 80 weight percent steam and about 20 weight percent nitrogen. Samples of the freshly activated catalyst and the treated catalyst were utilized in the disproportionation of a mixture of about 65 weight percent propylene and about 35 weight percent propane. The disproportionation reaction was conducted at about 450 p.s.i. and the other conditions shown in the table below.

The moist air and steam treatment was conducted at a space velocity of about 40 to 50 cubic feet of air, or steam, per pound of catalyst per hour at a pressure of about 10-50 p.s.i.g. for the indicated time.

The results of the runs are shown in the following Table I.

| Run No. | Pretreatment at 1100° F. hours atmosphere | Reaction time, hours | Reaction temp, ° F. | Space velocity, wt. feed/wt. cat./hr. | Wt. percent conversion | | Carbon, wt. percent of cat. |
|---|---|---|---|---|---|---|---|
| | | | | | 4th hr. | 10th hr. | |
| 1 | None | 10 | 800 | 61.2 | 49.5 | 42.5 | 24.8 |
| 2 | 150 air+100 p.p.m. H₂O | 10 | 800 | 60.8 | 45.8 | 40.7 | 8.6 |
| 3 | 300 air+100 p.p.m. H₂O | 10 | 800 | 58.3 | 48.3 | 40.0 | 6.7 |
| 4 | 150 80% steam+20% N₂ | 10 | 800 | 60.5 | 33.8 | 28.0 | 3.6 |
| 5 | 150 80% steam+20% N₂ | 10 | 825 | 60.5 | 44.8 | | |

The above data show that conversion can be obtained at the desired level by penetrating or tempering the catalyst with air containing a small amount of water. Furthermore, the conversion cycle is lengthened because excessive coking at the beginning of the cycle is avoided. The load on the distillation steps downstream from the reactors is maintained at a more nearly constant level by controlling the conversion level at the beginning of conversion cycle.

What is claimed is:

1. In the process of converting an olefin in the olefin reaction wherein at least one olefin hydrocarbon selected from the group consisting of cyclic and acyclic mono- and polyene olefin hydrocarbons and mixtures of at least one such olefin hydrocarbon and ethylene is converted in a reaction zone to products of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, in the presence of an olefin reaction catalyst comprising an oxide of tungsten associated with silica active for disproportionating propylene into ethylene and butene, having an initial period of high activity, under conditions of temperature and pressure suitable for producing products of the olefin reaction including temperatures in the range of about 600 to 1100° F. and pressures in the range of about 0 to 1500 p.s.i.g., the improvement comprising treating the catalyst with air containing about 10 to 10,000 p.p.m. by volume of water at a temperature in the range of about 950 to 1150° F. for a time sufficient to reduce the initial activity of the catalyst prior to utilizing said catalyst in said reaction zone.

2. The process of claim 1 wherein the catalyst is treated at a temperature of about 1100° F.

3. The process of claim 2 wherein the air utilized for treating the catalyst contains about 100 p.p.m. water by volume.

4. The process of claim 1 wherein the olefin is an acyclic monoene having from 3 to 30 carbon atoms per molecule.

5. The process of claim 4 wherein the olefin is propylene.

6. The process of claim 1 wherein the olefin is an acyclic mono- or polyene having 3 to 30 carbon atoms per molecule, a cyclic mono- or polyene having 4 to 20 carbon atoms per molecule, a mixture of said mono- or polyenes, or a mixture of at least one of said mono- or polyenes and ethylene.

7. The process of claim 1 wherein the air contains about 50 to 200 p.p.m. by volume of water.

8. The process of claim 1 wherein the catalyst is treated for about 30 minutes to 24 hours prior to utilization in the reaction zone.

9. The process of claim 8 wherein the olefin is propylene.

References Cited

UNITED STATES PATENTS

| 2,987,487 | 6/1961 | Stevens et al. | 252—467 |
| 3,261,879 | 7/1966 | Banks | 260—683 |
| 3,365,513 | 1/1968 | Heckelsberg | 260—683 |

DELBERT E. GANTZ, Primary Examiner

C. E. SPRESSER, Assistant Examiner

U.S. Cl. X.R.

252—458; 260—666, 668, 677, 680